(12) United States Patent
Yan

(10) Patent No.: US 6,869,205 B1
(45) Date of Patent: Mar. 22, 2005

(54) RETROFIT FLUORESCENT LAMP ADAPTOR

(75) Inventor: Ellis Yan, Russell, OH (US)

(73) Assignee: Technical Consumer Products, Inc., Aurora, OH (US)

( * ) Notice: Subject to any disclaimer, the term of this patent is extended or adjusted under 35 U.S.C. 154(b) by 123 days.

(21) Appl. No.: 10/308,255

(22) Filed: Dec. 2, 2002

Related U.S. Application Data

(60) Provisional application No. 60/338,606, filed on Dec. 2, 2001.

(51) Int. Cl.[7] ................................. F21K 2/00
(52) U.S. Cl. ................ 362/260; 362/216; 362/226; 362/388; 362/391; 362/410; 362/457; 362/414; 313/318.12; 439/229
(58) Field of Search ................ 362/260, 216, 362/226, 388, 391, 410, 457, 414; 439/227, 229, 236; 315/58, 62, 71; 313/318.12, 318.01, 49, 51; 445/22, 23, 26

(56) References Cited

U.S. PATENT DOCUMENTS

| | | | | |
|---|---|---|---|---|
| 4,406,969 A | * | 9/1983 | Haraden et al. | 313/318.01 |
| 5,471,375 A | | 11/1995 | Lau | |
| 6,083,021 A | | 7/2000 | Lau | |
| 6,429,592 B1 | * | 8/2002 | Zhou | 315/56 |
| 6,531,824 B1 | * | 3/2003 | Yan | 315/58 |

* cited by examiner

*Primary Examiner*—Sandra O'Shea
*Assistant Examiner*—Sharon Payne
(74) *Attorney, Agent, or Firm*—Joseph H. Taddeo

(57) ABSTRACT

A novel fluorescent lamp adaptor that safely converts an existing fluorescent lighting fixture that was designed to hold a "2D" 4-pin series fluorescent lamp to one that uses a "2C" series twin circular fluorescent lamp. The use of a type "2C" fluorescent lamp is advantageous because of its compactness, and greater efficiency, which is commensurate with a longer operational life.

17 Claims, 6 Drawing Sheets

RETROFIT FLUORESCENT LAMP ADAPTOR

REFERENCE TO PREVIOUSLY FILED APPLICATIONS

Applicant claims the benefit of and priority from U.S. Provisional Patent Application No. 60/338,606, filed on Dec. 2, 2001.

FIELD OF THE INVENTION

The present invention relates primarily to a fluorescent lamp adaptor, and more particularly, to a fluorescent lamp adaptor which will safely retrofit a fluorescent lamp that is less reliable, with a long life fluorescent lamp, to effect compatibility between the two light sources.

BACKGROUND OF THE INVENTION

Some present day fluorescent lighting fixtures use a type "2D" lamp as the source of illumination.

Thorn EMI Lighting in the United Kingdom conceived the "2D" fluorescent lamp in 1981. The lamp was so named because it resembles a pair of the letters "D" placed back to back. General Electric Lighting, who introduced several different sizes and wattages to the "2D" style product line, is now manufacturing the lamps. The line was expanded to include five different wattage ratings, ranging from 10 to 38 watts and having three different base styles.

Two of the smaller lamps in the series have starters included in the base of the lamp, hence requiring only two pins for an interconnection. The remaining three lamps in the series, each being of the larger wattage, do not use starters. It therefore becomes necessary to use four pins to interconnect with its respective ballast.

This style of lamp has an average rated life of between 8,000 to 10,000 hours dependent upon its wattage rating and size. A type "2D" lamp is more costly than the time proven and tested twin circular fluorescent lamp, which normally has an average rated life of ranging between 9,000 and 12,000, costing about one-half as much and having a greater lumen output.

To obviate the need for replacing the type "2D" fluorescent lamp with an identical less reliable replacement lamp, the present invention allows the substitution using a replacement lamp that is more commonly available, and one that demonstrates a long life of operation.

The following prior art discloses the various aspects in the design and use of the "2D" series fluorescent lamp and its application.

U.S. Pat. No. 6,083,021, granted Jul. 4, 2000, to K. Lau, discloses a lamp assembly mount that is adapted to receive a specific commercially available fluorescent lamp that is known as the "2D" lamp. This lamp is commercially produced in several different sizes, having several different wattage ratings. Because the design of the base of the "2D" lamp is specific to its wattage rating, the lamp assembly mount will only receive the correct lamp, thereby eliminating the interchangement with higher or lower wattage fluorescent lamps.

U.S. Pat. No. 5,471,375, granted Jul. 4, 2000, to K. Lau, discloses a lamp mounting base assembly that is adapted to mount a specific commercially available fluorescent lamp. The unit is characterized by the design of a ballast housing to fit inside a space defined by the fluorescent lamp internally of the surrounding, somewhat annular fluorescent tube. The base assembly is designed to minimize the mounting of under- or over-wattage fluorescent tubes.

Presently, the prior art teaches of a fluorescent lamp base assembly that is uniquely configured for application using a specific wattage "2D" type of fluorescent lamp source of illumination to prevent the interchangement with other types of fluorescent lamps and more specifically with other "2D" fluorescent lamps having different wattage ratings.

Hence, the prior art recited above does not teach of the novel advantages that are found in the present invention.

What is needed is a universal adaptor, one that is universal in design, and one that allows the use of a more reliable twin circular fluorescent lamp, a lamp having greater illumination intensity, thereby permitting the substitution of the less reliable, less efficient, type "2D" fluorescent lamp.

Safety being of primary concern, the novel adaptor is interlocking and sealed as a means of being tamperproof to eliminate the potential of receiving an electrical shock.

In addition, lamp wattages greater than the UL approved design wattage rating cannot be used, thereby preventing it to contributing in being a fire hazard. In this regard, the present invention fulfills this need.

SUMMARY OF THE INVENTION

The present invention relates to a novel fluorescent lamp adaptor, an adaptor that will safety convert a fluorescent lighting fixture that was designed to hold a "2D" 4-pin series fluorescent lamp to one that can use a type "2C" series twin circular fluorescent lamp.

Safety being paramount, the lamp adaptor of the present invention, is designed using a housing made of an insulating material such as a rigid injection molded plastic. The boxlike portion of the adaptor housing is comprised of two interlocking pieces, a base and cover, and when assembled is sealed preferably by using thermal bonding or either by using a suitable adhesive or glueing agent, thereby eliminating the potential of a shock hazard.

The "2D" fluorescent lamp is available in three select wattage ratings of 10, 16 and 21 watts. There is also a larger "2D" fluorescent lamp that is available in two wattage ratings of 28 and 38 watts. The "2D" system is the highest output fluorescent lamp—the 38-watt system gives nearly the same light output of a 150-watt incandescent light bulb.

The use of the "2C" series twin circular fluorescent lamp is preferable for use because it is energy efficient, having a greater illumination output; is more reliable, longer lasting; and is less costly and more readily available in the replacement market.

This novel adaptor assembly is comprised of a transition module having interchangeable lamp mounting brackets. A four-wire cable having a four-receptacle plug connects into the pins of the "2C" fluorescent lamp.

At the base of the transition module are four pins that are in a recessed cavity having the equivalent dimensions of that of the "2D" fluorescent lamp base so that the novel assembly comprising the instant invention is completely interchangeable with the "2D" fluorescent lamp.

The "2C" twin circular fluorescent lamp is available in a 40-watt rating. It is mounted via a standard lamp mounting bracket or alternatively via a bent-wing type bracket that is snapped into two rectangular recesses in the top of the transition module housing, where it is securely retained.

It is advantageous to use the "2C" twin circular fluorescent lamp as a replacement for the aforementioned "2D" series fluorescent lamp because of its compactness and because of its increased longevity, which typically ranges between 9,000 and 10,000 hours, and because of its reduced operating costs and improved energy efficiency.

Accordingly, it is therefore an object of the present invention to provide for a novel adaptor to retrofit a lighting fixture, such as, a table or a floor lamp that uses a "2D" series fluorescent lamp with a "2C" twin circular fluorescent lamp.

It is another object of the present invention to provide for a novel adaptor to retrofit a lighting fixture, such as, a table or a floor lamp that uses a "2D" series fluorescent lamp with a "2C" twin circular fluorescent lamp, without the need for tools, either of the common or specialized type.

It is still another object of the present invention to provide for a novel adaptor to retrofit a lighting fixture, such as, a table or a floor lamp that uses a "2D" series fluorescent lamp with a "2C" twin circular fluorescent lamp, where an inexperienced person can install the adaptor by unplugging the "2D" fluorescent lamp, and replacing it with the newly designed retrofit adaptor.

It is still yet another object of the present invention to provide for a novel adaptor to retrofit a lighting fixture, such as, a table or a floor lamp that uses a "2D" series fluorescent lamp with a "2C" twin circular fluorescent lamp, where the "2C" series lamp is easily installed by an inexperienced person by snapping the center tube into the receiving ends of the lamp mounting bracket and inserting the plug end into the mating pins located on the "2C" lamp.

An additional object of the present invention to provide for a novel adaptor to retrofit a lighting fixture, such as, a table or a floor lamp that uses a "2D" series fluorescent lamp with a "2C" twin circular fluorescent lamp, is to provide safe operation by interlocking and sealing as a means of being tamperproof to eliminate the potential of receiving an electrical shock.

A final object of the present invention is to provide for a novel adaptor to retrofit a lighting fixture, such as, a table or a floor lamp that uses a "2D" series fluorescent lamp with a "2C" twin circular fluorescent lamp, is to provide non-interchangeability with higher wattage lamps to eliminate the potential of creating a fire hazard.

These, as well as other objects and advantages of the present invention will be better understood and appreciated upon reading the following detailed description of the preferred embodiment and it's alternative embodiments when taken in conjunction with the accompanying drawings.

BRIEF DESCRIPTION OF THE DRAWINGS

The present invention is pictorially illustrated in the accompanying drawings that are attached herein.

DETAILED DESCRIPTION OF THE INVENTION

The present invention relates to a novel fluorescent lamp adaptor that will allow the replacement of a "2D" series lamp with a "2C" series twin circular lamp. The adaptor can be easily installed without the need of dismantling an installed fixture or an existing table or floor lamp. Specialized tools are not needed to install the adaptor to convert the fixture from using a type "2D" fluorescent lamp to using a type "2C" twin circular lamp.

Figure 1:
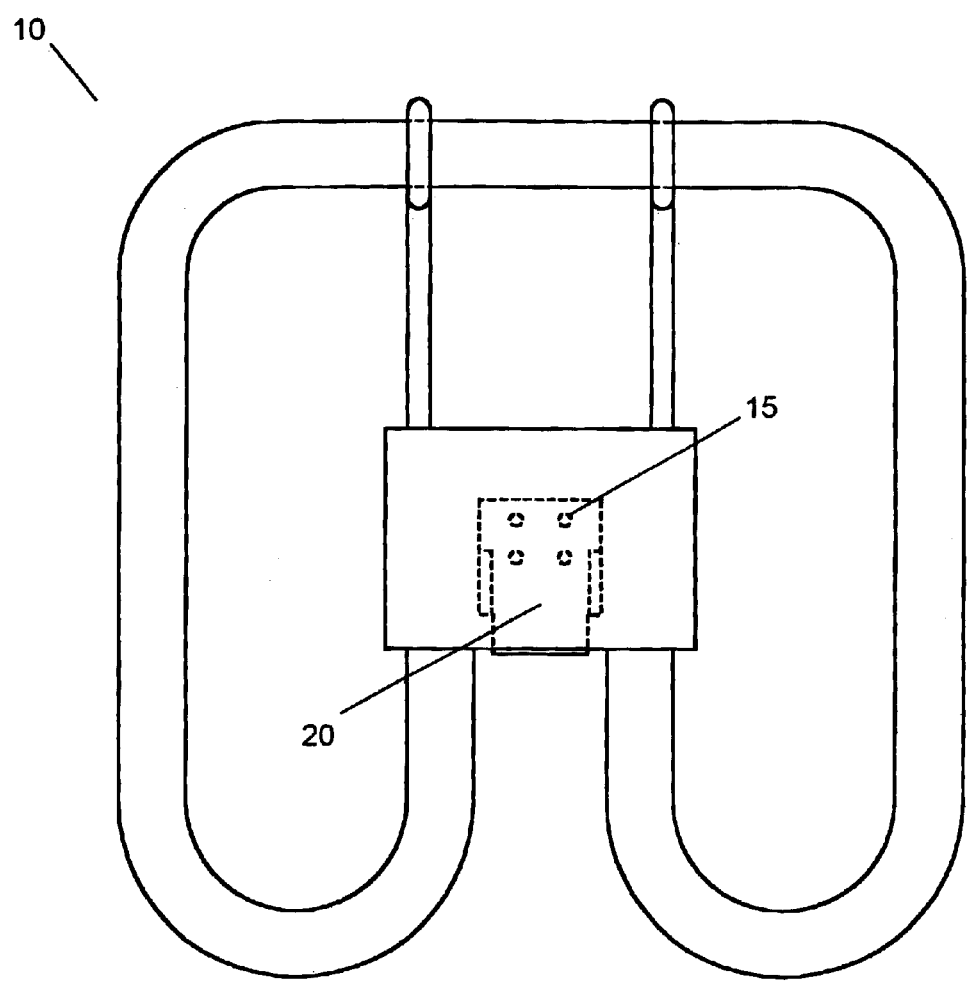
FIG. 1 is a top view of the prior art "2D" fluorescent lamp having a 4-pin base arrangement for engagement with the lamp receptacle.

As shown in FIG. 1, the prior art "2D" fluorescent lamp 10 has a 4-pin base configuration for engagement with the lamp receptacle. An array of the four pins 15 that is centrally located in the base recess cavity 20, and where the pins are securely mounted to a base platform.

Figure 2:
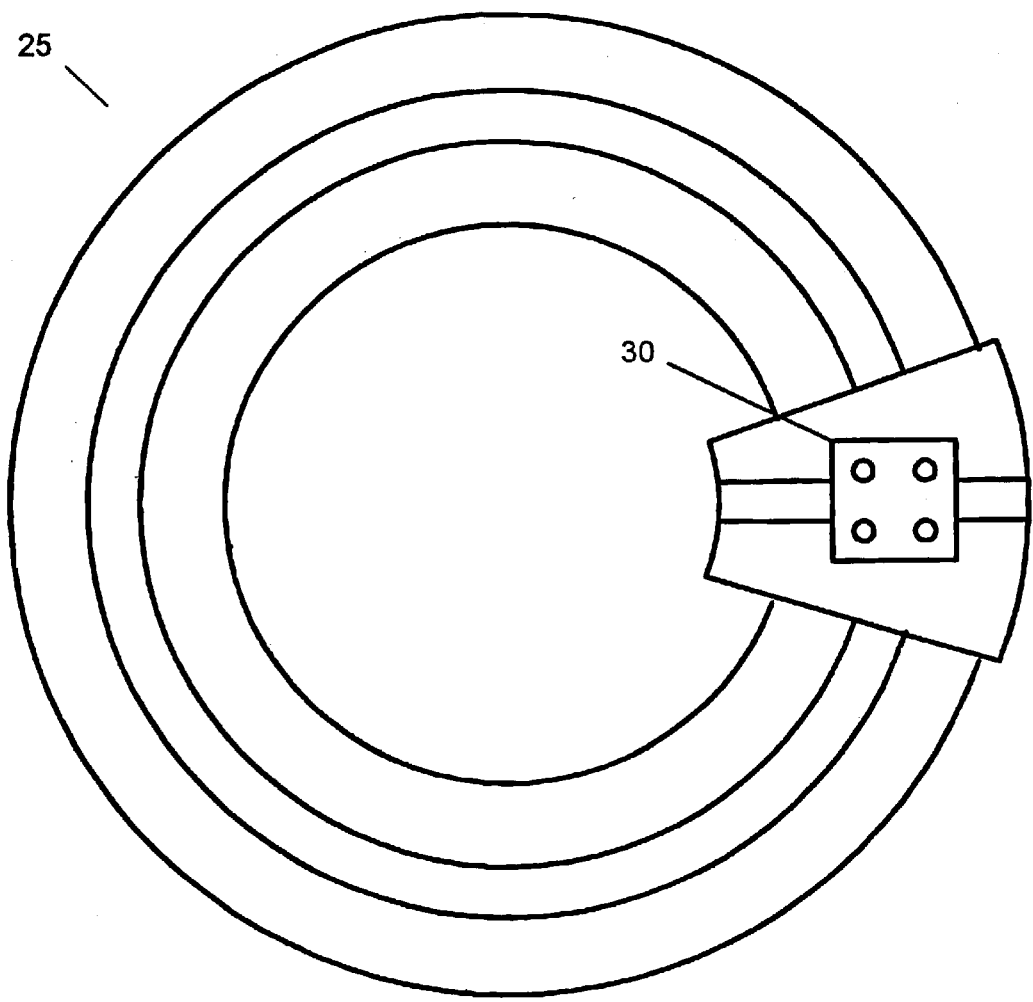
FIG. 2 is a top view of the prior art twin circular type "2C" fluorescent lamp, having a 4-pin socket for its interconnection termination.

A prior art "2C" twin circular fluorescent lamp 25 is shown in FIG. 2. A centrally located grouping of four-pins 30 comprises the means of interconnecting the lamp to provide power to the lamp. The lamp is commercially available as the TCP Model 17040, which is rated at 40 watts. The 40-watt rating emits an illumination intensity that is equivalent to a 175-watt incandescent bulb. It has color temperature is 2,850 degrees K. and has a life expectancy in excess of 10,000 hours. It is compact, having an outer diameter of approximately 7.5 inches.

Figure 3:
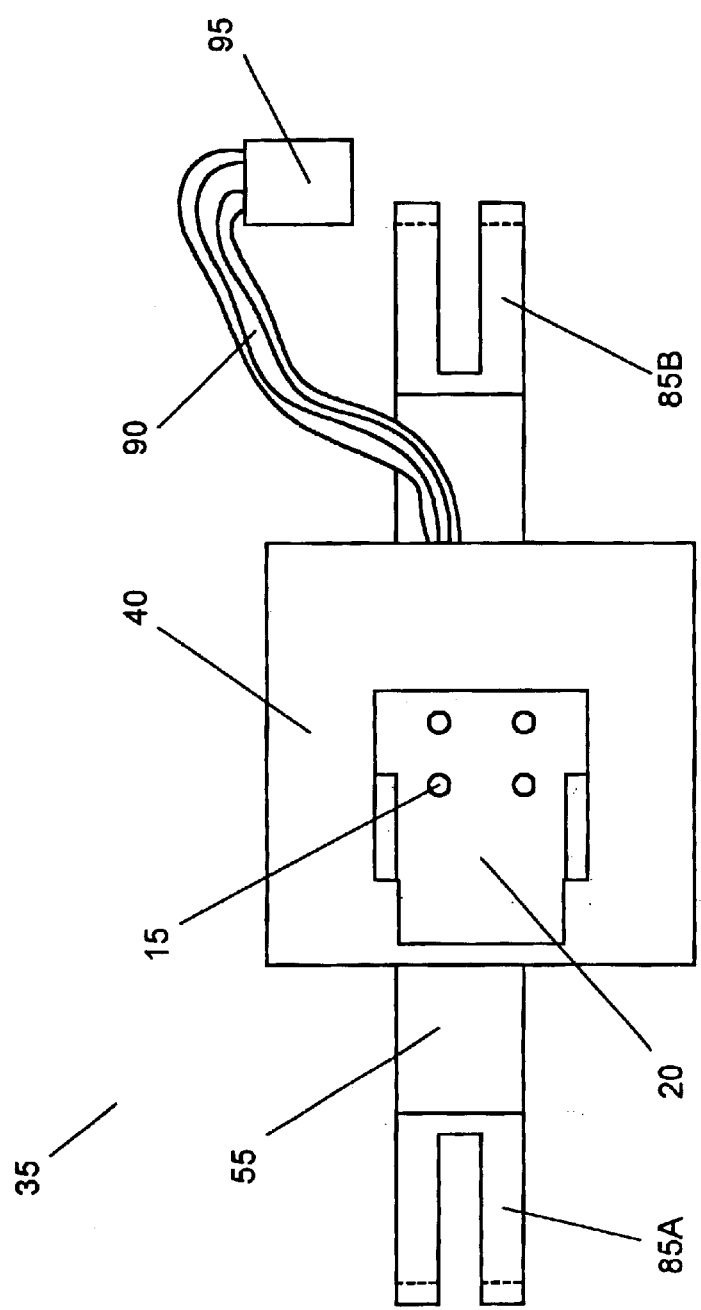
FIG. 3 is a bottom view of the present invention, without the twin circular type "2C" fluorescent lamp mounted.
Figure 4:
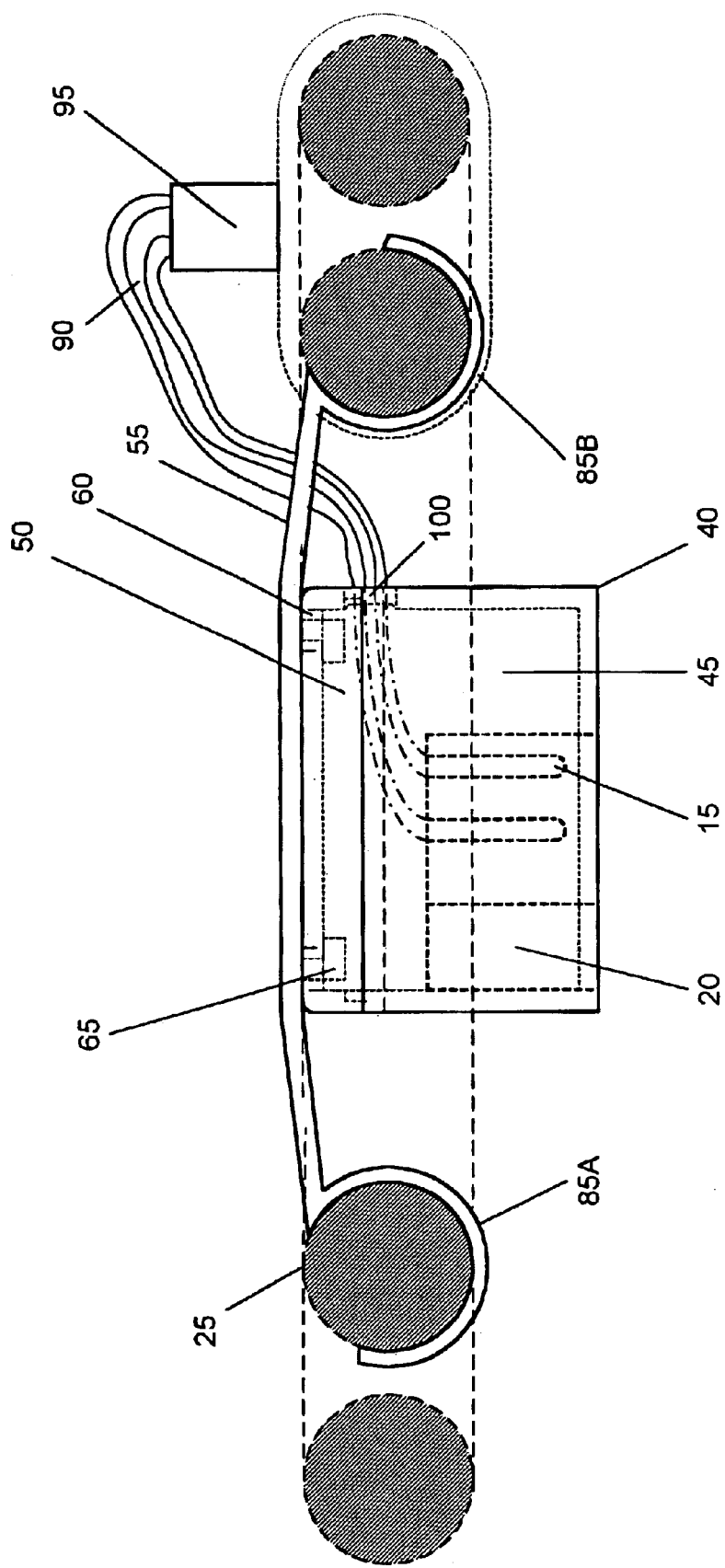
FIG. 4 is a side sectional plan view of the present invention, having the twin circular type "2C" fluorescent lamp mounted in the straight lamp mounting bracket.

Turning now to FIGS. 3 and 4, the present invention relates primarily to a novel fluorescent lamp adaptor 35 to convert the operation of the lighting fixture, or table or floor lamp, from a "2D" fluorescent lamp to a more easily obtained, high efficiency, compact "2C" twin circular fluorescent lamp.

This novel fluorescent lamp adaptor provides existing lighting fixtures, and table or floor lamps with a means of converting the source of illumination to a compact fluorescent lamp that was not in existence or available at the time of original manufacture. In addition, it can be implemented during the time of manufacture to update a product line so that the source of illumination can be substituted with a modernized fluorescent lamp for an older less reliable lamp. The fluorescent lamp adaptor is easily installed into an existing fixture without the need of dismantling the installed fixture or table/floor lamp or needing any additional tools.

The fluorescent lamp adaptor assembly 35 is comprised of a transition module 40 that is comprised of a bottom housing base 45 and a housing cover 50, and a straight lamp support bracket 55 which is interchangeable with a bent-wing mounting bracket 105.

Safety being paramount, the lamp adaptor of the present invention, is designed using a housing made of an insulating substance such as a rigid injection molded thermoplastic material. The boxlike portion of the adaptor housing 40 is comprised of two interlocking pieces, a base 45 and cover 50, and when assembled is sealed preferably by using thermal bonding or either by using a suitable adhesive or gluing agent, thereby eliminating the potential of a shock hazard.

By having the two subassemblies, 45 and 50, being interlocking and subsequently bounded together, renders the completed assembly tamperproof to further minimize the potential of a shock hazard.

To further improve the safe operation of the adaptor of the present invention, the socket and pin arrangement used to receive the replacement "2C" or "C" fluorescent lamp uniquely prevents interchangement with lamps having higher wattage ratings, thereby preventing over-heating of a fixture that was originally designed for use with lamps having a specific wattage rating or less. By restricting and limiting the use of lamps having wattages greater than the UL approved designed wattage rating, the potential of creating a fire hazard is eliminated.

The transition module 40 and support bracket 55 are made of a semi-rigid thermoplastic material that is injection molded.

The housing cover 50 has two oppositely disposed rectangular openings 60 that receive two locking projections 65 extending beneath the support bar 55 after it is snapped into place upon the housing base 45.

Located at the base of the transition module 40 are four pins 15 that are in a recessed cavity 20 having the equivalent dimensions of that of the "2D" fluorescent lamp base so that the novel assembly comprising the instant invention is completely interchangeable with the "2D" fluorescent lamp.

The type "2C" twin circular fluorescent lamp 25 is snap-fitted in the cradled ends 85A and 85B of the straight support bracket 55. A four-wire cable 90 with a 4-pin receptacle connector 95, extending from the adaptor housing opening 100, conducts the AC power derived from a ballast (not shown) to the extreme ends of the twin circular fluorescent lamp 25.

Figure 5:
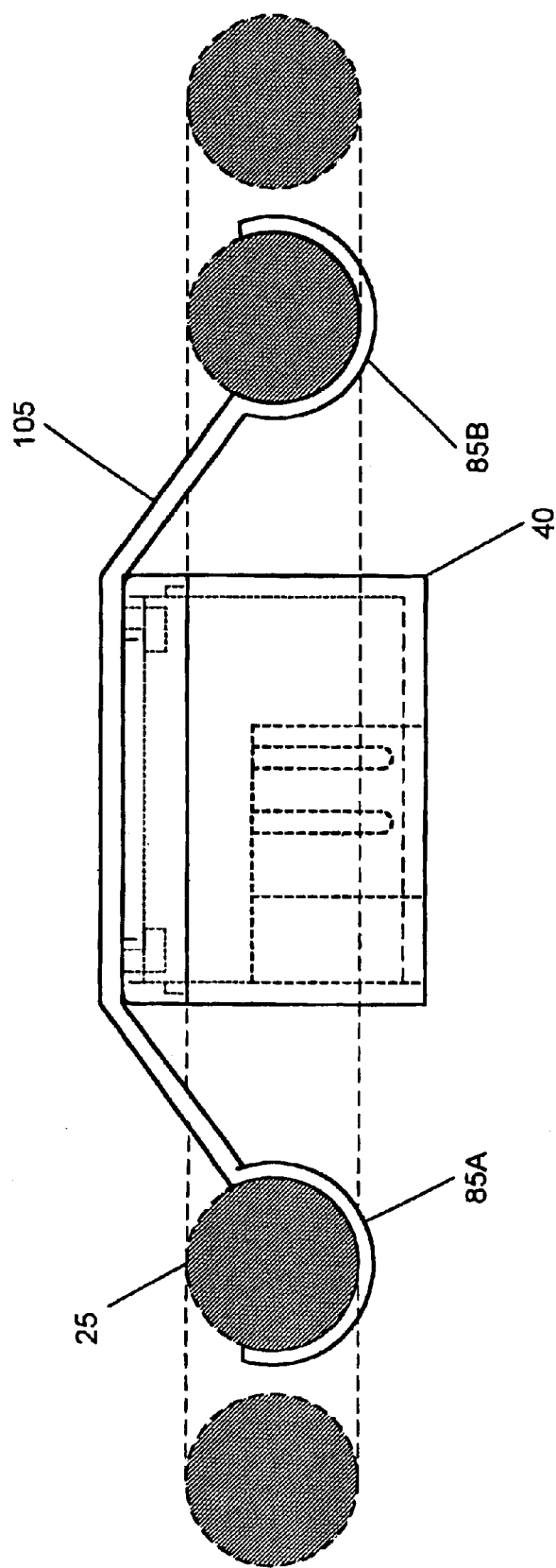
FIG. 5 is a side sectional plan view of the present invention, having the twin circular type "2C" fluorescent lamp mounted in an alternative bent-wing styled lamp mounting bracket.

Turning now to FIG. 5, there is shown in a side elevational view, a second embodiment of the fluorescent lamp adaptor transition module 40, having alternatively mounted, a bent-wing lamp support bracket 105. This bracket is useful in applications where the source of illumination is lower, as may be required for use in a desk lamp.

Figure 6:
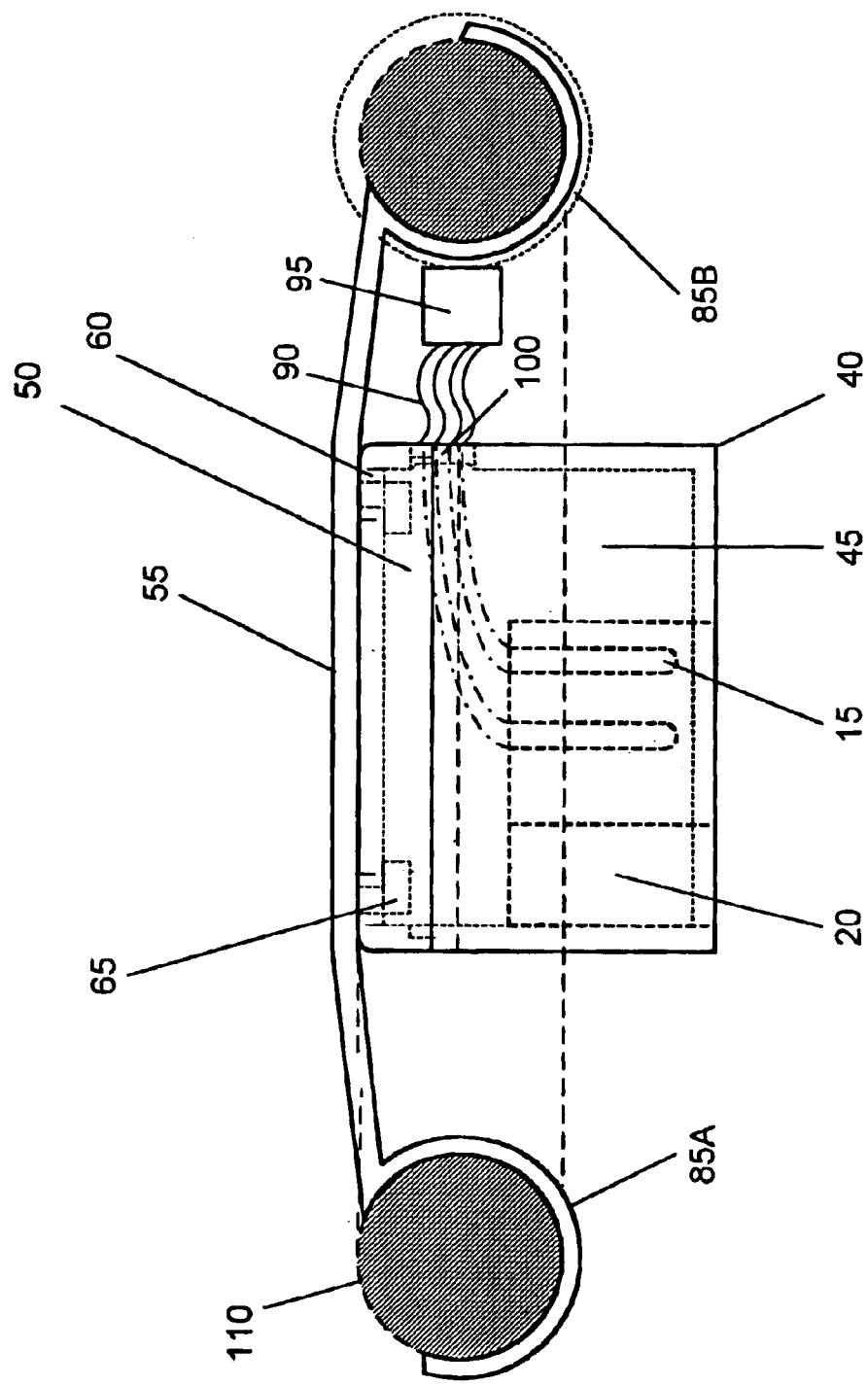
FIG. 6 is a side sectional plan view of the present invention, having alternatively, a single circular tube type fluorescent lamp mounted in the lamp bar bracket.

There is shown in FIG. 6, a third alternative embodiment, that utilizes a single circular lamp 110, in applications where a more subdued lighting is desired.

It should be appreciated and understood that the preceding detailed description is for example only. There may be other modifications, deviations, and improvements made, however, without departing from the true spirit of the present invention.

What is claimed is:

1. A retrofit adaptor for a fluorescent illumination source, comprising:

a transition module formed to have a boxlike housing and including two interlocking pieces, a base and a cover;

the transition module including a means for retaining a circular fluorescent lamp;

the transition module including a means for converting operation of the fluorescent illumination source from a 2D fluorescent lamp to a long life 2C circular fluorescent lamp.

2. The retrofit adaptor for a fluorescent illumination source in accordance with claim 1, the transition module including a pair of rectangular recesses on a top portion of the cover;

a lamp mounting bracket having a pair of locking projections each snapped into a corresponding rectangular recess for retention of the lamp mounting bracket.

3. The retrofit adaptor for a fluorescent illumination source in accordance with claim 2, wherein an at least one circular fluorescent lamp is mounted in a straight lamp mounting bracket.

4. The retrofit adaptor for a fluorescent illumination source in accordance with claim 2, wherein an at least one circular fluorescent lamp is mounted in a bent-wing style lamp mounting bracket.

5. The retrofit adaptor for a fluorescent illumination source in accordance with claim 2, wherein the base and cover are fixed together with a consequent reduction of a shock hazard.

6. The retrofit adaptor for a fluorescent illumination source in accordance with claim 5, wherein the base and the cover are sealed together using a thermal bonding.

7. The retrofit adaptor for a fluorescent illumination source in accordance with claim 6, wherein the housing is fabricated of an insulating material.

8. The retrofit adaptor for a fluorescent illumination source in accordance with claim 7, the insulating material comprising a rigid injection molded thermoplastic material.

9. The retrofit adaptor for a fluorescent illumination source in accordance with claim 8, further comprising a means for interconnecting the 2C lamp to the adaptor to provide power to the 2C lamp.

10. The retrofit adaptor for a fluorescent illumination source in accordance with claim 9, the base including a base recess cavity with an array of four pins mounted on a base platform for connection with a lamp power source.

11. The retrofit adaptor for a fluorescent illumination source in accordance with claim 10, further comprising a four-wire cable having a four-receptacle plug that connects with pins of the 2C circular fluorescent lamp.

12. The retrofit adaptor for a fluorescent illumination source in accordance with claim 11, wherein the adaptor supporting an at least one 2C circular fluorescent lamp is interchangeable with a 2D fluorescent lamp without a need for tools.

13. The retrofit adaptor for a fluorescent illumination source in accordance with claim 12, wherein a person can install the adaptor in substitution for a 2D fluorescent lamp that is unplugged and replaced by the retrofit adaptor.

14. The retrofit adaptor for a fluorescent illumination source in accordance with claim 13, wherein the adaptor is installed into an existing light fixture without a need of dismantling the fixture, a floor or a table lamp.

15. An adaptor to retrofit a lighting fixture having a 2D series fluorescent lamp with a 2C circular fluorescent lamp, with an adaptor assembly comprising a transition module having a pair of interchangeable fluorescent circle lamp mounting brackets, a four-wire cable including a four-receptacle plug connected to four pins of the 2C circular fluorescent lamp; wherein a second four-pin set within the transition module have dimensions equivalent to corresponding pins of the 2D series fluorescent lamp and the adaptor assembly is interchangeable with the 2D series fluorescent lamp; and, wherein said adapter provides non-interchangeability with higher wattage lamps to eliminate a potential for creation of a fire hazard.

16. A method for substituting a 2C fluorescent lamp for a 2D fluorescent lamp comprising:

providing an adaptor having a four pin array identical to the 2D series fluorescent lamp, and a means for connecting with a 2C fluorescent lamp;

unplugging the 2D fluorescent lamp from a lighting fixture;

plugging the adaptor into the lighting fixture; and connecting the 2C fluorescent lamp to the adaptor.

17. The method of claim 16, further comprising securing the 2C fluorescent lamp to the adaptor.

* * * * *